H. E. WARREN.
MECHANISM FOR CONTROLLING THE SPEED OF TURBINES OR OTHER PRIME MOVERS CONNECTED IN PARALLEL.
APPLICATION FILED SEPT. 25, 1911.
1,095,178.
Patented Apr. 28, 1914.
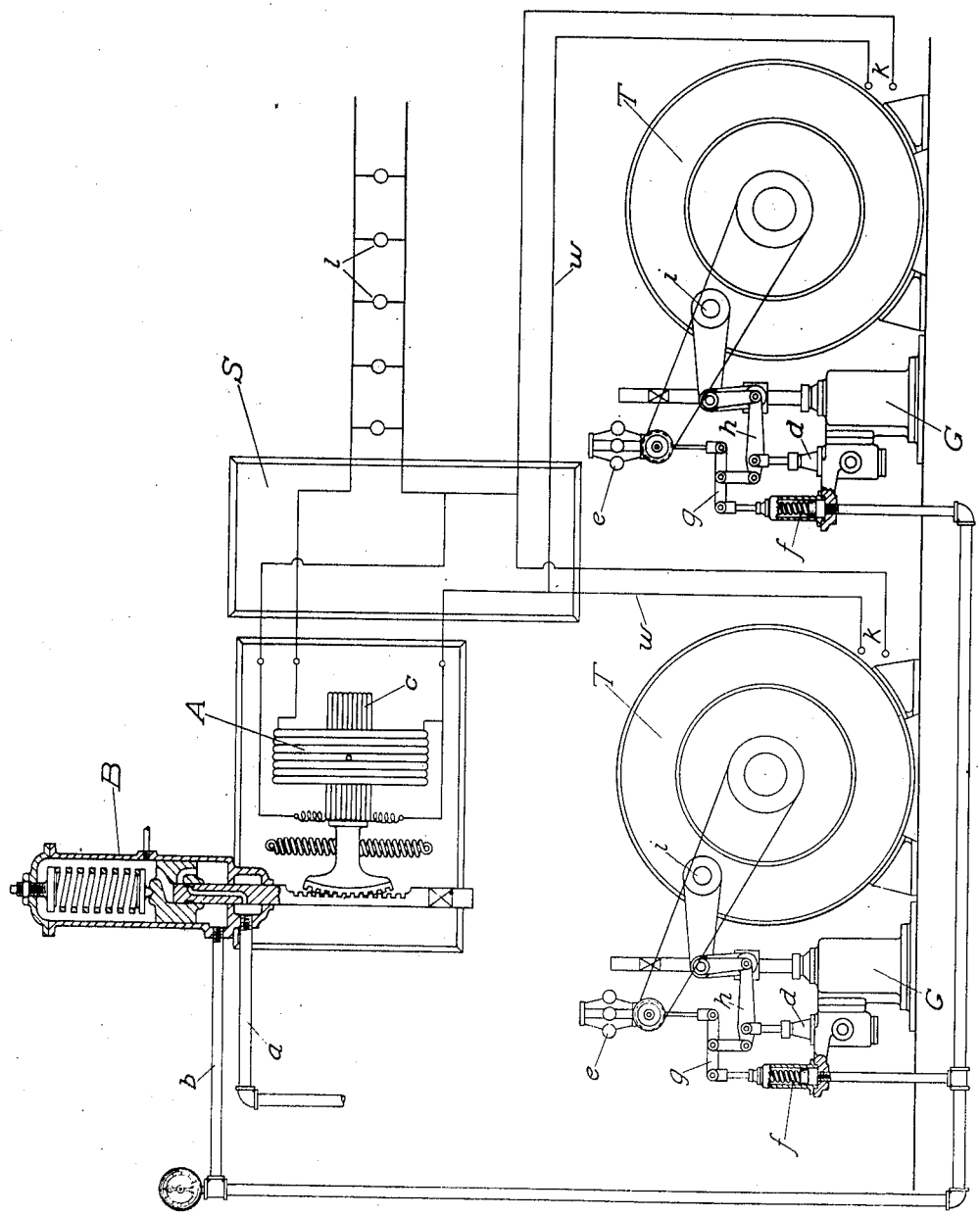
WITNESSES:
Florence A. Collins
Charles S. Wadbury
INVENTOR.
Henry E. Warren.
BY
Reuben L. Roberts,
ATTORNEY.

UNITED STATES PATENT OFFICE.

HENRY E. WARREN, OF ASHLAND, MASSACHUSETTS, ASSIGNOR TO THE LOMBARD GOVERNOR COMPANY, OF ASHLAND, MASSACHUSETTS, A CORPORATION OF NEW JERSEY.

MECHANISM FOR CONTROLLING THE SPEED OF TURBINES OR OTHER PRIME MOVERS CONNECTED IN PARALLEL.

1,095,178.      Specification of Letters Patent.      Patented Apr. 28, 1914.

Application filed September 25, 1911. Serial No. 651,110.

*To all whom it may concern:*

Be it known that I, HENRY E. WARREN, a citizen of the United States of America, and resident of Ashland, in the county of Middlesex and Commonwealth of Massachusetts, have invented Improvements in Mechanism for Controlling the Speed of Turbines or other Prime Movers Connected in Parallel, of which the following is a specification.

This invention relates to mechanism for controlling the speed of a plurality of turbines or other prime-movers when connected in parallel, and it comprises the following important elements:—First, a wattmeter or electrical current-actuated device controlled by the total output of electrical generators which are driven by the turbines; second, means for magnifying the motion of the wattmeter and transmitting the same with multiplied force to controllers of the separate governors of the turbines; third, governors with the necessary connections to operate the gates or valves of the turbines.

Referring to the drawings, A represents the wattmeter or electric current-actuated device, which is intended to be connected with the outgoing feeders from the switchboard in such a manner that the deflections of the moving coil will be proportional to the total output of the generators.

B is an automatic pressure controller, taking fluid at high pressure from supply pipe $a$ and delivering the same at reduced pressure through pipe $b$, which leads to the governors of the several turbines. The function of B is to maintain a pressure in the pipe system $b$ varying with and corresponding to the deflections of the moving coil $c$ of the wattmeter A, but with multiplied force.

G, G, are familiar forms of governors for controlling the speed of turbines. These governors are respectively actuated by means of regulating valves $d$, $d$, and these valves are respectively under the mutual control of a centrifugal element $e$, and a pressure-actuated piston $f$. It will be apparent that the positions of the pistons $f$, $f$, will depend upon the pressure in the pipe $b$, and this in turn, will vary with the position of the moving coil $c$ of the wattmeter A which controls the valve B. Consequently, through the systems of levers $g$, $h$, changes in load $l$ at the switchboard S, will produce corresponding changes in the respective regulating valves $d$, $d$, of the governors G, G, and this will result in immediate adjustment of the gates $i$, $i$, of the turbines T, T. Therefore, the output of the turbines through their generators connected at $k$, $k$, will be made to correspond almost instantly with the station output, without waiting for changes in speed which would affect the centrifugal elements $e$, $e$, of the governors. The latter are not essential for purposes of regulation by this method, but are provided as safeguards against any injury to the pipe line $b$ or the fluid supply pipe $a$, which would cause the failure of proper action of the governors G, G, if not supplemented by the centrifugal elements $e$, $e$.

It will be noticed that by connecting in parallel the several generators, driven by the prime-movers T, with the wattmeter A through the wires $w$, as in this system of control, the load may be divided proportionately among any number of prime-movers.

I am aware that means have been suggested heretofore for controlling output, by means of a wattmeter connected to the governor of a single prime-mover; and although there has also been a suggestion for operating several such governors in parallel by a single wattmeter, so far as I am able to understand the suggestion the arrangement proposed would be wholly unsuccessful and impracticable. Further, if it were attempted to accomplish this by means of separate wattmeters at each governor, the method would be unsatisfactory and practically inoperative, for two reasons: first, on account of the added cost and complication of the wattmeters, which are necessarily expensive and delicate; and second, because it would be almost impossible and wholly impracticable to connect the wattmeters either to the generator circuits or to the outgoing lines in such a manner as to cause them to divide the load properly among the different units. For example, if each of these wattmeters was connected to the circuit of the generator which it was controlling, it would be responsive not only to changes in the total load of the station, but also to all interchanges of energy among the generators in the station. That is to say, if the total load should remain constant, and one generator increased its output slightly by feeding into another generator, the tendency of the separate controlling wattmeters would be to still further increase the output of the machine which was already carrying more than its proportion of the load and decrease the output of any other machine carrying less than its proportion of the load, and there would evidently be a strong tendency toward dividing the load unequally among the different generators. If on the other hand, all the governors were provided with separate wattmeter controllers, and these controllers were connected to the outgoing lines of the station, it would be necessary to continually readjust all the wattmeters as units were brought into or removed from service. For example, if the load were being carried by a single unit, the wattmeter of that unit would require to be so adjusted as to cause a large gate movement for a given change in the total load; while if there were two units running, the wattmeters of both units would require to be readjusted so that each one would cause only one half as great gate movement for the same change in load as before. Likewise, if the number of units were still further increased it would be necessary to reduce the sensitiveness of each separate wattmeter for the addition of every new unit.

In this system which I have invented, there is but one wattmeter to look after and adjust by any of the well known means for the purpose, as units are added or subtracted. The interconnecting means between this wattmeter and the several governors, is of such a nature as to produce like effects upon all the machines, so that they will under all conditions divide the total load being carried, proportionately among the different units

I claim:—

Mechanism for governing a plurality of prime-movers for independent generators, consisting of a series of governors mutually responsive to variations of pressure in a fluid system and independently responsive to speed variations of the units which they respectively control, and means to vary the pressure in the fluid system according to the combined output of the units governed.

HENRY E. WARREN.

Witnesses:
 REUBEN L. ROBERTS,
 FLORENCE A. COLLINS.